(12) United States Patent
Asao et al.

(10) Patent No.: US 6,636,193 B1
(45) Date of Patent: Oct. 21, 2003

(54) LIQUID CRYSTAL DEVICE

(75) Inventors: Yasufumi Asao, Kanagawa-ken (JP); Takeshi Togano, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 09/671,625

(22) Filed: Sep. 28, 2000

(30) Foreign Application Priority Data

Oct. 1, 1999 (JP) .............................................. 11-280909

(51) Int. Cl.[7] .................................................. G09G 3/18
(52) U.S. Cl. ............................. 345/96; 345/92; 345/89; 349/37; 349/38
(58) Field of Search .................. 345/87–104, 208–210; 349/132, 133, 33, 38, 37, 155

(56) References Cited

U.S. PATENT DOCUMENTS

| | | | | |
|---|---|---|---|---|
| 5,091,557 A | | 2/1992 | Nagai et al. ................... 560/39 |
| 5,534,892 A | * | 7/1996 | Tagawa ....................... 345/173 |
| 5,717,418 A | | 2/1998 | Shapiro et al. ................ 345/89 |
| 5,750,214 A | | 5/1998 | Ito et al. ......................... 428/1 |
| 5,868,960 A | | 2/1999 | Kosaka et al. .......... 252/299.01 |
| 5,932,136 A | | 8/1999 | Terada et al. ........... 252/299.01 |
| 6,083,574 A | | 7/2000 | Asao et al. .................... 428/1.1 |
| 6,120,702 A | * | 9/2000 | Miyamoto et al. ......... 428/1.26 |
| 6,122,031 A | | 9/2000 | Terada et al. ................ 349/155 |
| 6,128,064 A | | 10/2000 | Moriyama et al. .......... 349/173 |
| 6,496,170 B1 | * | 12/2002 | Yoshida et al. ................ 345/87 |

OTHER PUBLICATIONS

Japanese Journal of Applied Physics, vol. 22, No. 10 (1983), pp. L661–L663.
Applied Physics Letters, vol. 18, No. 4 (1971), pp. 127–128.

* cited by examiner

*Primary Examiner*—Lun-Yi Lao
(74) *Attorney, Agent, or Firm*—Fitzpatrick, Cella, Harper & Scinto

(57) ABSTRACT

A liquid crystal device suitable for analog gradational display according to active matrix drive is formed using a chiral smectic liquid crystal. The voltage-transmittance (V-T) characteristic change accompanying a cell thickness change can be minimized to allow the production of such a liquid crystal device at a higher yield. In the liquid crystal device, the liquid crystal is placed in such an alignment state that the liquid crystal is monostabilized under no voltage application and is tilted in response to the application of voltages of opposing polarities so that the saturation voltage becomes larger at small cell thickness (liquid crystal layer thickness).

5 Claims, 4 Drawing Sheets

LIQUID CRYSTAL DEVICE

BACKGROUND OF THE INVENTION

The present invention relates to a liquid crystal device used for light valves used in flat panel displays, projection displays, printers, etc.

The twisted nematic (TN) mode, disclosed by M. Schadt and W. Helfrich (e.g., Appl. Phys. Lett., vol. 18, no. 4, pp. 127–128 (Feb. 15, 1971), has been used as a representative mode for a nematic liquid crystal device extensively used for display devices using active elements such as thin film transistors (TFTs).

On the other hand, in recent years, liquid crystal displays according to an in-plane switching mode utilizing a lateral electric field and a vertical alignment mode have been proposed to improve the viewing angle characteristic, which has been problematic in conventional liquid crystal displays.

As described above, several liquid crystal drive modes are known for TFT display devices using nematic liquid crystals, but any drive mode has a slow response time of several tens of milliseconds or more, and an improvement in response speed is desired.

Some liquid crystal drive modes using chiral smectic liquid crystals have been proposed in recent years for improving the response speed of conventional nematic liquid crystal devices, including a short pitch-type ferroelectric liquid crystal mode, a polymer stabilization-type ferroelectric liquid crystal mode and a thresholdless anti-ferroelectric liquid crystal mode, all of which have been reported as realizing high speed responsiveness on the order of a sub-millisecond or less; these have not been commercialized.

On the other hand, we also have proposed a liquid crystal device wherein a liquid crystal material shows a phase transition series on temperature decrease of isotropic liquid phase (Iso.)—cholesteric phase (Ch)—chiral smectic C phase (SmC*) or Iso—SmC* causing a direct phase transition from Iso to SmC* substantially without intervening Ch phase so as to provide a monostable state at a position inside a chiral smectic one. At the time of phase transition of Ch—SmC* or Iso—SmC*, a DC voltage is applied across a pair of electrodes sandwiching the liquid crystal to make uniform the smectic layer directions. As a result, it is possible to realize a liquid crystal device which allows a high speed response and gradation control, which also exhibits excellent motion picture quality and high luminance and which also allows mass production.

Such ferroelectric liquid crystals and antiferroelectric liquid crystals causing an inversion switch owing to spontaneous polarization are all liquid crystals assuming a chiral smectic phase. Thus, it is expected to realize a display device using a chiral smectic liquid crystal capable of solving the problem of slow response speed accompanying the conventional nematic liquid crystal.

As described above, it has been expected to utilize a smectic liquid crystal device exhibiting high speed responsiveness and gradational display characteristic as a next generation display device. At present, however, optimum device design, particularly optimum design of holding capacitance, has not been achieved.

Regarding the holding capacitance design for a liquid crystal having a spontaneous polarization, Takato has reported that it is important to provide as large a holding capacitance as possible for appropriately designing such a liquid crystal having a spontaneous polarization (AMLCD, vol. 97, pp. 29-). More specifically, assuming that liquid crystal molecules are not inverted within a gate-on period during active matrix drive using TFTs (TFT drive), a charge supplied to a device during the gate-on period is compensated by inversion of spontaneous polarization to result in a decease in charge remaining at the device, thereby causing a voltage drop. The voltage drop Vd caused by the inversion of spontaneous polarization can be approximately expressed by the following equation (1):

$$Vd = 2 \times Ps' \times S/(C_{1c} + Cs) \quad (1),$$

wherein Ps' denotes a magnitude of actually inverted spontaneous polarization depending on a desired gradation level. For example, in the case of displaying a 50% gradational level, Ps' is equal to half the spontaneous polarization (Ps) of the liquid crystal material. S denotes an area of the switching region; $C_{1c}$ denotes a capacitance of the liquid crystal layer, and Cs denotes a magnitude of the holding capacitance. From the above equation (1), a smaller Vd requires a larger holding capacitance (Cs).

On the other hand, we have noticed that in the above-mentioned device utilizing a monostability of a chiral smectic liquid crystal, when using a very large holding capacitance relative to the liquid crystal capacitance for a TFT drive, a small difference in liquid crystal layer thickness (cell thickness) results in a remarkable change in the voltage-transmittance characteristic.

SUMMARY OF THE INVENTION

In view of the above-mentioned problems, a principal object of the present invention is to provide a liquid crystal device using a liquid crystal having a spontaneous polarization, particularly one having the above-mentioned phase transition series, placed in a monostable alignment state, which device shows little fluctuation in V-T characteristic even with some fluctuation in cell thickness in an active matrix device, thus allowing a high yield of production.

According to the present invention, there is provided a liquid crystal device suitable for analog gradational display according to active matrix drive comprising: a pair of substrates disposed to have mutually opposing surfaces of which at least one has been subjected to a uniaxial aligning treatment, and a chiral smectic liquid crystal disposed between the substrates so as to form a matrix of pixels, each provided with an active element and electrodes for applying a voltage to the liquid crystal via the active element, wherein the liquid crystal is placed in such an alignment state that the average molecular axis of the liquid crystal is monostabilized at a first position under no voltage application, the average molecular axis of the liquid crystal is tilted under application of a first polarity of voltage at an angle a1 in a first direction from the monostabilized first position depending on a magnitude of the applied voltage, and the average molecular axis of the liquid crystal is tilted under application of a second polarity of voltage opposite to the first polarity at an angle a2 in a second direction opposite to the first direction from the monostabilized first position depending on a magnitude of the second polarity voltage, so that at least one of the tilt angle α1 and α2 has a tendency to increase at a larger liquid crystal layer thickness between the substrates.

In a preferred embodiment of the device, a holding capacitance Cs is coupled to each active element, satisfying a relationship of $Cs \leq 1.5 \times C_{1c}$ with a capacitance $C_{1c}$ of the liquid crystal, or such a holding capacitance is not coupled to each active element.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
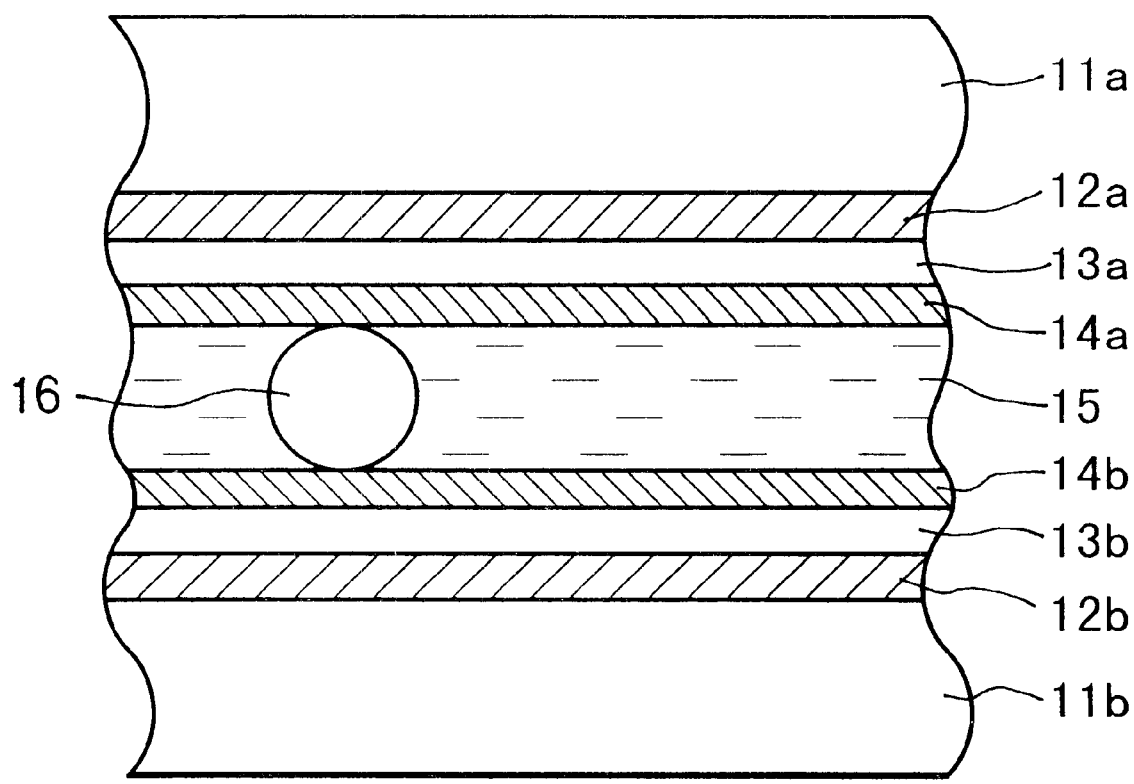
FIG. 1 is a schematic partial sectional view of a liquid crystal device according to an embodiment of the invention.

The liquid crystal device according to the present invention is a liquid crystal device for practicing analog gradational display according to active matrix drive, including a pair of substrates disposed to have mutually opposing surfaces of which at least one has been subjected to a uniaxial aligning treatment and a chiral smectic liquid crystal disposed between the substrates so as to form a matrix of pixels, each provided with an active element and electrodes for applying a voltage to the liquid crystal via the active element. In the liquid crystal device, the liquid crystal is placed in such an alignment state that the average molecular axis of the liquid crystal is monbstabilized in a first state under no voltage application, the average molecular axis of the liquid crystal is tilted under the application of a first polarity of voltage at an angle $\alpha 1$ in a first direction from the monostabilized position depending on the magnitude of the applied voltage, and the average molecular axis of the liquid crystal is tilted under the application of a second polarity of voltage opposite to the first polarity at an angle $\alpha 2$ in a second direction opposite to the first direction from the monostabilized position depending on the magnitude of the second polarity of voltage, so that at least one of the tilt angles $\alpha 1$ and $\alpha 2$ has a tendency to increase at a larger cell thickness (liquid crystal layer thickness). As a result, the fluctuation in device characteristic corresponding to a cell thickness fluctuation can be reduced during the active matrix drive. Further, by designing the device so as to suppress the ratio of holding capacitance to liquid crystal capacitance to a specific value or lower, it becomes possible to further suppress the performance fluctuation corresponding to a cell thickness change, thus allowing a higher productivity.

In the liquid crystal device of the present invention, each pixel can be provided with or not provided with a holding capacitance. In the case of using a holding capacitance, the holding capacitance is desirably designed to be at most 1.5 times the liquid crystal capacitance or at most 3.0 (nF).

In the liquid crystal device of the present invention, a liquid crystal having phase transition series of preferably Iso—Ch—SmC* or Iso—SmC* is used and supplied with either a positive or a negative voltage applied between a pair of substrates so that the liquid crystal is uniformly aligned to either one of two smectic layer directions, that is, the normal to the smectic layer is uniformly deviated in one direction from the average uniaxial aligning treatment direction, whereby the liquid crystal molecules are stabilized under no voltage application at a position within the chiral smectic helical cone (when allowed to form a helical state) to lose the memory characteristic of the liquid crystal.

In the liquid crystal device of the present invention, the liquid crystal is preferably aligned so that its alignment vector (average molecular alignment axis) is substantially parallel to, more specifically at an angle of below 5 degrees from the uniaxial alignment axis direction provided to the axis.

Such a liquid crystal device of spontaneous polarization inversion-type may be driven by the application of a polarity of voltage so as to cause a shift of molecules in such a direction allowing a larger angle of shift from the uniaxial aligning treatment direction. In such a case where the bulk liquid crystal layer is strongly affected by a strong uniaxial alignment regulation force, the influence of the uniaxial alignment regulation force is larger at a smaller cell thickness and smaller at a larger cell thickness. Thus, the switching becomes more difficult at a smaller thickness and easier at a larger thickness. Thus, this switching performance (hereinafter called "cell thickness dependence-1") is opposite that of a conventional SSFL device (surface-stabilized ferroelectric liquid crystal device), wherein the switching performance is proportional to an electric field strength.

Incidentally, in a case where the uniaxial alignment regulation force is sufficiently small, the cell thickness dependence is assumed to be similar to that in the conventional SSFLC device, wherein the switching depends on an electric field strength.

On the other hand, in the case of an active matrix drive for the above-mentioned type of drive mode, a liquid crystal device having a larger sum of liquid crystal capacitance and holding capacitance has a larger voltage retention or holding ratio. The holding capacitance is a substrate design factor and is constant for a certain device. On the other hand, the liquid crystal capacitance varies depending on the cell thickness. More specifically, a larger cell thickness provides a smaller liquid crystal capacitance, and a smaller cell thickness provides a larger liquid crystal capacitance. Accordingly, there is a tendency that a larger cell thickness results in a lower voltage retention ratio, and a smaller cell thickness results in a higher voltage retention ratio. In other words, in the case of an active matrix drive, a larger voltage is applied to the liquid crystal layer at a smaller cell thickness, and only a smaller voltage is applied to the liquid crystal layer at a larger cell thickness. This characteristic is hereinafter called "cell thickness dependence-2".

Incidentally, in a case where a liquid crystal response is completed within a gate-on period in the active matrix drive, i.e., in a case where the liquid crystal response time is shorter than the gate-on period, the only factors affecting the voltage retention ratio are the ohmic current component and charge movement caused by the movement of impurities in the liquid crystal layer, so that the cell thickness dependence-2 is not so large in the case where the liquid crystal has a high purity. On the other hand, in a case where the liquid crystal response time is longer than the gate-on period, the voltage retention ratio is also affected by a polarization inversion current caused by inversion of a spontaneous polarization of the liquid crystal per se in addition to the above-mentioned current component. Thus, the cell thickness dependence-2 becomes substantial particularly in the case where the liquid crystal response time is long relative to the gate-on period.

The above-mentioned two types of cell thickness dependence cancel each other out. Accordingly, the active matrix drive of a liquid crystal device having the cell thickness dependence-1 in the case of a large alignment regulation force of the substrate boundary has a characteristic of reducing fluctuations in liquid crystal device performance when a liquid crystal device is accompanied with a cell thickness fluctuation due to certain variation in the production process. Incidentally, if the holding capacitance is substantially large relative to the liquid crystal capacitance, the change in liquid crystal capacitance does not substantially influence the capacitance of the entire device, so that the cell thickness dependence-2 is substantially lost. Accordingly, too large a holding capacitance is not desired. More specifically, according to the result of our study, the holding capacitance is preferably at most 1.5 times the liquid crystal capacitance, or numerically at most 3 nF/cm$^2$.

Hereinafter, the organization of a liquid crystal device according to the present invention will be described more specifically with reference to the drawings.

FIG. 1 is a schematic partial sectional view of a liquid crystal device according to an embodiment of the present invention. Referring to FIG. 1, the liquid crystal device includes a pair of substrates 11a and 11b having thereon electrodes 12a and 12b, insulating layers 13a and 13b, and alignment control layers 14a and 14b, respectively, a liquid crystal layer 15 disposed between the substrates, and a (bead) spacer 16 for determining the liquid crystal layer thickness (cell thickness).

More specifically, in the liquid crystal device shown in FIG. 1, the liquid crystal layer 15 comprising a liquid crystal (material) assuming a chiral smectic phase is sandwiched between the pair of substrates 11a and 11b comprising a material having a high transparency, such as glass or plastic.

The substrates 11a and 11b are provided with electrodes 12a and 12b of transparent electrode materials, such as In$_2$O$_3$, ITO (indium tin oxide), etc. Regarding the electrodes 12a and 12b, as will be described in further detail later, one substrate 11a (or 11b) is provided with a matrix of dot-form transparent electrodes each connected with an active element, such as a TFT or MIM (metal insulator metal) device, as a switching device, and the other substrate 11b (or 11a) is provided with a counter electrode disposed over its entirety or in a prescribed pattern thereon, so as to form an active matrix device structure.

The electrodes 12a and 12b are coated, as desired, with insulating layers 13a and 13b of materials such as SiO$_2$, TiO$_2$, Ta$_2$O$_3$, etc., e.g., for preventing a short circuit therebetween.

Further, alignment control layers 14a and 14b are formed on the insulating layers 13a and 13b, respectively, in contact with the liquid crystal layer 15 so as to control the alignment state thereof. At least one of the alignment control layers 14a and 14b has been subjected to a uniaxial alignment treatment. Such aligning control layers 14a and 14b may be formed by application in a solution state of an organic material, such as polyimide, polyamide imide, polyamide, polyvinyl alcohol, etc., or a precursor thereof, followed by rubbing, or may be formed as an oblique vapor deposition film of an inorganic material, such as an oxide such as SiO or a nitride, formed by vapor deposition onto a substrate in an oblique direction at a prescribed angle from the substrate.

By selecting, e.g., the material and condition for treatment (such as uniaxial aligning treatment) of the alignment control films 14a and 14b, the molecules of the liquid crystal layer 15 are aligned at a controlled pretilt angle (an angle formed by liquid crystal molecules in the vicinities of a boundary with the alignment control layer with respect to the alignment control layer).

In the case where the alignment control layers 14a an 14b are both subjected to a uniaxial aligning treatment, the directions of the uniaxial aligning treatment (particularly, rubbing directions) for the two layers can be set to be parallel or parallel and opposite to each other or so as to cross each other at an angle of at most 45 degrees, depending on the liquid crystal material used. In the present invention, it is desirable that the uniaxial aligning treatment has been applied at a sufficient intensity also from the viewpoint of developing the cell thickness dependence-1.

The substrates 11a and 11b are disposed opposite to each other with the spacer 16 disposed therebetween. The spacer 16 is used to determine the gap (cell thickness) between the substrates 11a and 11b and may, for example, comprise silica beads. The cell thickness thus-determined may have an optimum range varying depending on the liquid crystal material used and may preferably be set within a range of 0.3–10 $\mu$m so as to develop a uniform uniaxial alignment characteristic and the alignment state where the liquid crystal molecules are aligned to assume an average molecular axis in substantial agreement with an average of the aligning treatment axes. It is further preferred that the cell thickness is appropriately adjusted so as to provide a desired retardation value and so that the helical pitch in a bulk state of the chiral smectic liquid crystal is at least two times the cell thickness.

It is also possible to disperse adhesive particles (not shown) comprising a resinous material, such as epoxy resin, in addition to the spacer (beads) 16 so as to enhance the adhesion between the substrates 11a and 11b and improve the impact resistance of the liquid crystal layer 15 assuming a chiral smectic phase.

In the liquid crystal device of the above-described structure, because of the material of the liquid crystal layer 15 and the device features such as the material and treatment conditions of the alignment control layers 14a and 14b, the liquid crystal is placed in such an alignment state that the average molecular axis of the liquid crystal is placed in a monostabilized first state under no voltage application, the average molecular axis is tilted in one direction from the monostabilized position under the application of a voltage of a first polarity at an angle $\alpha 1$ depending on the magnitude of the first polarity voltage, and the average molecular axis is tilted in a reverse direction from the monostabilized position under the application of a voltage of a second polarity opposite to the first polarity at an angle $\alpha 2$ depending on the magnitude of the second polarity voltage. It is possible to provide a tilt angle characteristic such that a maximum tilt angle $\alpha 1$ under the application of the first polarity voltage is larger than a maximum tilt angle $\beta 2$ under the application of the second polarity voltage. It is particularly preferred to satisfy $\beta 1 \geq 5 \times \beta 2$ for effecting a substantially non-hold type display described hereinafter.

The liquid crystal showing a chiral smectic phase used in the present invention may comprise a composition formed by mixing liquid crystal materials appropriately selected from hydrocarbon-type liquid crystal materials, naphthalene-based liquid crystal materials and polyfluorinated liquid crystal materials, having skeletons of biphenyl, phenylcyclohexane ester, phenylpyrimidine, etc.

The liquid crystal used in the present invention preferably shows a phase transition series of Iso.—Ch—SmC* or Iso.—SmC*. Specific examples of compounds providing liquid crystal compositions showing such a phase transition series may include the following.

Compound 1

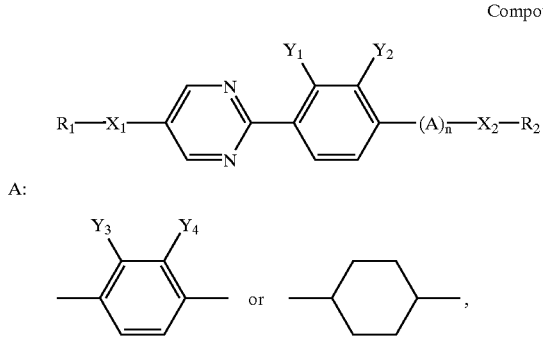

wherein $R_1$ and $R_2$ independently denote a linear or branched group of 1–20 carbon atoms capable of having a substituent; $X_1$ and $X_2$ independently denote a single bond, O, COO or OOC; $Y_1$, $Y_2$, $Y_3$ and $Y_4$ independently denote H or F; and n is 0 or 1.

Compound 2

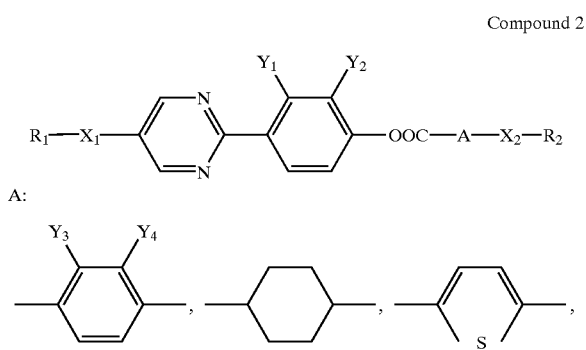

wherein $R_1$ and $R_2$ independently denote a linear or branched group of 1–20 carbon atoms capable of having a substituent; $X_1$ and $X_2$ independently denote a single bond, O, COO or OOC; and $Y_1$, $Y_2$, $Y_3$ and $Y_4$ independently denote H or F.

Compound 3

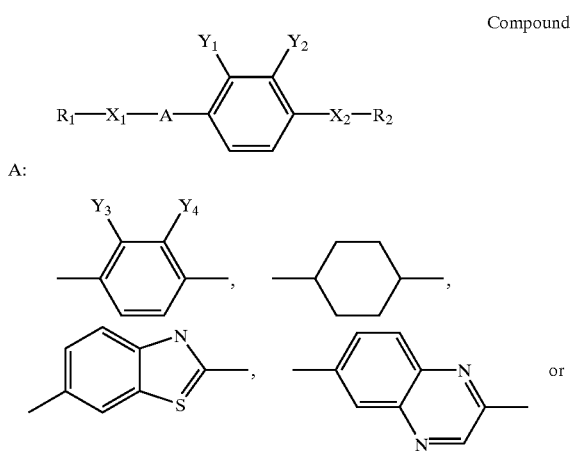

-continued

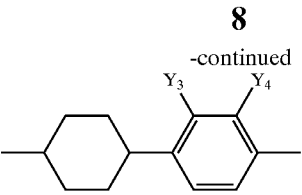

wherein $R_1$ and $R_2$ independently denote a linear or branched group of 1–20 carbon atoms capable of having a substituent; $X_1$ and $X_2$ independently denote a single bond, O, COO or OOC; and $Y_1$, $Y_2$, $Y_3$ and $Y_4$ independently denote H or F.

Compound 4

A:

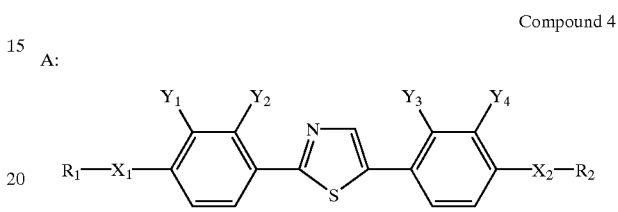

wherein R1 and R2 independently denote a linear or branched group of 1–20 carbon atoms capable of having a substituent; X1 and X2 independently denote a single bond, O, COO or OOC; and $Y_1$, $Y_2$, $Y_3$ and $Y_4$ independently denote H or F.

In order to realize the desired cell thickness dependence of tilt angle α (i.e., a larger α at a larger cell thickness), it is preferred to use a liquid crystal (composition) having a spontaneous polarization of at most 10 nC/cm².

The liquid crystal device according to the present invention is obtained by injecting such a liquid crystal composition into a cell structure as described above at a temperature providing the isotropic phase or cholesteric phase of the composition.

The liquid crystal device can be formed as a color liquid crystal device by providing a color filter layer including segments of R (red), G (green) and B (blue) to one of the substrates 11a and 11b.

The liquid crystal device of the present invention may be composed as a transmission-type device including the substrates 11a and 11b and the electrodes 12a and 12b and sandwiched between a pair of polarizers for effecting a display by causing incidence light from an external light source to enter from one substrate side and causing modulated light from the liquid crystal layer to be emitted through the other substrate. Alternatively, the liquid crystal device of the present invention can also be constituted as a reflection-type device wherein either the substrate 11a and electrode 12a or the substrate 11b and the electrode 12b are made transparent and provided with a polarizer, and the other substrate is provided with a reflection plate or the substrate or electrode thereon is composed of a reflective material, whereby light is incident from a transparent side and, after modulation through the liquid crystal layer, is also emitted out of the transparent side.

In order to effect a substantially non-holding type display described hereinafter with the liquid crystal device of the present invention, it is preferred that the liquid crystal device shows a transmittance (in the case of a transmission type device) or reflectance (in the case of a reflection type device) T1 under the application of a first polarity voltage and a transmittance or reflectance T2 under the application of a second polarity voltage satisfying $T1 \geq 5 \times T2$.

In the liquid crystal device of the present invention, in addition to the above-described organization, each pixel is provided with an active element to effect an active matrix drive for analog gradational display. The organization for active matrix drive according to the present invention will be described with reference to FIGS. 2–4.

Figure 2:
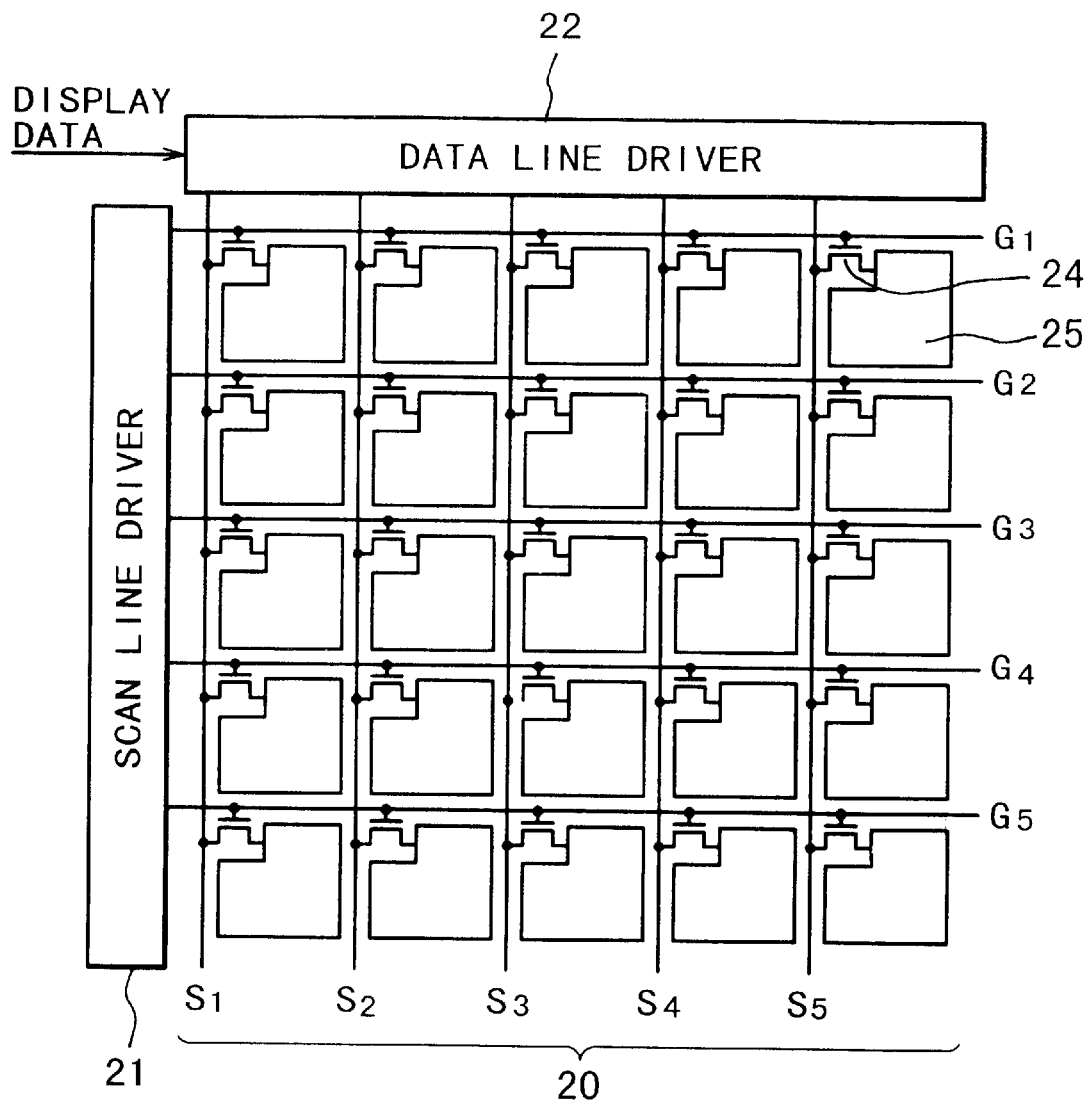
FIG. 2 is a schematic plan view illustrating an arrangement of an active matrix substrate and peripheral drivers in a liquid crystal device according to an embodiment of the present invention.

FIG. 2 is a schematic plan view illustrating an arrangement of an active matrix substrate and peripheral drive circuits in a liquid crystal device according to an embodiment of the present invention.

Referring to FIG. 2, in a panel unit 20 corresponding to a liquid crystal device, gate lines G1, G2, . . . , corresponding to scanning signal lines which extend laterally and are connected to a scanning signal driver 21, and source lines S1, S2, . . . , corresponding to data signal lines which extend vertically and are connected to a data signal driver 22, are disposed to intersect each other while being insulated from each other. At each intersection of the gate lines G1, G2, . . . and the source lines S1, S2, . . . , a TFT (switching element) 24 is disposed, and a pixel electrode 25 is connected thereto to form a pixel. FIG. 2 shows only 5×5 pixel regions for convenience of illustration, but a larger number of pixel regions are actually included. As a switching element (active element), it is also possible to use a MIM element instead of a TFT.

The gate lines G1, G2, . . . are connected to gate electrodes of TFTs 24, the source lines S1, S2, . . . are connected to source electrodes of the TFTs 24, and the pixel electrodes 25 are connected to drain electrodes of the TFTs 24. Based on the structure, the gate lines G1, G2 . . . are sequentially selected by the scanning signal driver 21 to be supplied with a gate voltage. In synchronism with the sequential scanning selection of the gate lines, data signal voltages corresponding to data written at respective pixels are supplied from the data signal driver 22 via the source lines S1, S2, . . . and TFTs 24 on the selected gate line to the corresponding pixel electrodes 25.

Figure 3:
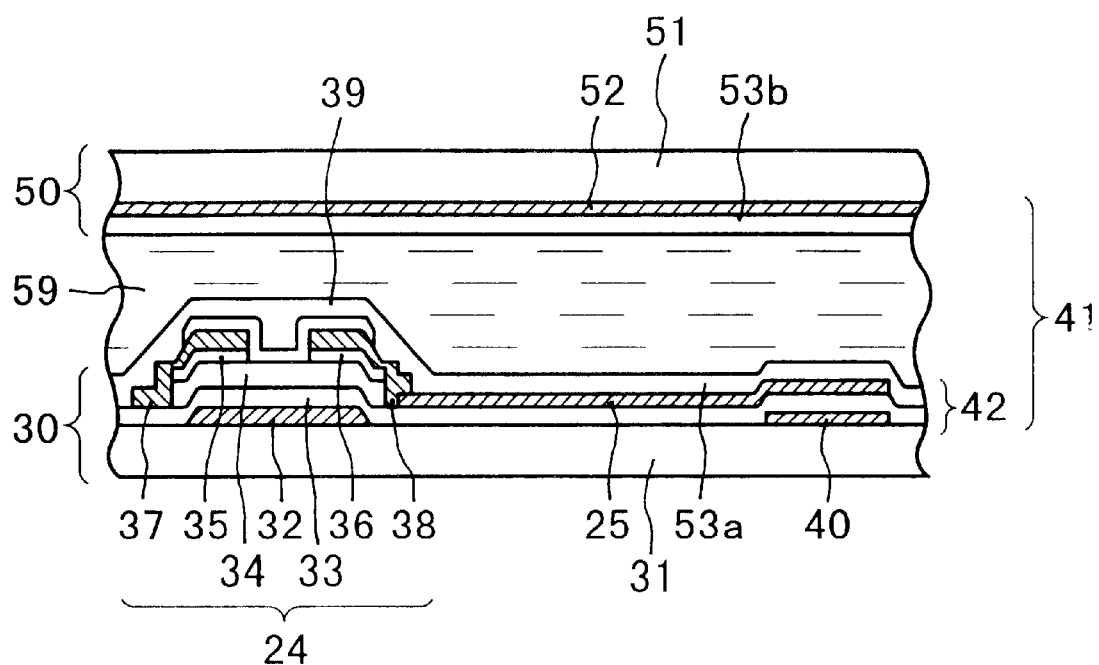
FIG. 3 is a schematic partial sectional view showing an organization of one pixel portion of the liquid crystal device shown in FIG. 2.

FIG. 3 is a schematic partial sectional view showing an organization of one pixel region of the panel 20 shown in FIG. 2. Referring to FIG. 3, each pixel is formed by an active matrix substrate 30 including a substrate 31, a pixel electrode 25, a TFT 24 including a gate electrode 32 formed thereon, a gate insulating film 33, an a(amorphous)-Si layer 34, n+a-Si layers 35 and 36, a source electrode 37, a drain electrode 38, a channel protection film 39, a holding capacitor electrode 40 giving a holding capacitance 42, an alignment control layer 53, a counter substrate 50 including a transparent substrate 51, a common electrode 52, an alignment control layer 53, and a liquid crystal layer 59 giving a liquid crystal capacitance 41 disposed between the active matrix substrate 30 and the counter substrate 50.

Thus, in the structure shown in FIG. 3, the liquid crystal layer 59 assuming a chiral smectic phase is disposed between the active matrix substrate 30 having thereon the TFT 24 and the pixel electrode 25 and the counter substrate 50 provided with the common electrode 42 to provide a liquid crystal capacitance ($C_{1c}$) 41.

Regarding the active matrix substrate 30, FIG. 3 shows an example using an a(amorphous)-Si TFT 24. More specifically, a TFT 24 is formed on a substrate 31 of glass, etc., by successively forming a gate electrode 32 connected to the gate lines G1, G1, . . . shown in FIG. 2, an insulating film (gate insulating film) 33 and an a-Si layer 34. On the a-Si layer 34, a source electrode 37 and a drain electrode 38 are disposed in separation from each other and via n+a-Si layers 35 and 36, respectively. The source electrode 37 is connected to one of the source lines S1, S2, . . . shown in FIG. 2, and the drain electrode 38 is connected to a pixel electrode 25 comprising a transparent conductor film, such as an ITO film. The a-Si layer 34 of the TFT 24 is further coated with a channel protection film 39. The TFT is turned on when a gate pulse is applied to the gate electrode 32 at the time of scanning selection of the corresponding gate line.

In the active matrix substrate 30, a holding capacitance (Cs) 42 can be formed by a structure sandwiching a portion of the insulating film 33 (also covering the gate electrode) with the pixel electrode 25 and a holding capacitor electrode 40 disposed on the substrate 31 in parallel with the liquid crystal capacitance ($C_{1c}$) given by the liquid crystal layer 29 as shown in FIG. 3. When a large area of the holding capacitor electrode 40 is required, the holding capacitor electrode 40 can be formed of a transparent conductor film, such as an ITO film, so as not to lower the aperture ratio.

Over the TFT 24 and the pixel electrode 25 of the active matrix substrate 30, an alignment control layer 53a for controlling the alignment state of the liquid crystal 59 is provided. On the other hand, the counter substrate 50 is formed by coating a transparent substrate 51 entirely with a common electrode 52 and an alignment control layer 53b, respectively, in a uniform layer. The alignment control layers 53a and 53b correspond to the alignment control layers 14a and 14b described with reference to FIG. 1.

As explained with reference to FIG. 1, the liquid crystal device shown in FIG. 3 can be constituted in a transmission type by sandwiching the structure between a pair of polarizers or in a reflection type by disposing a polarizer only on the counter substrate 50 side.

The TFT 24 can also be formed by using a polycrystalline Si (p-Si) layer instead of the a-Si layer 34.

Figure 4:
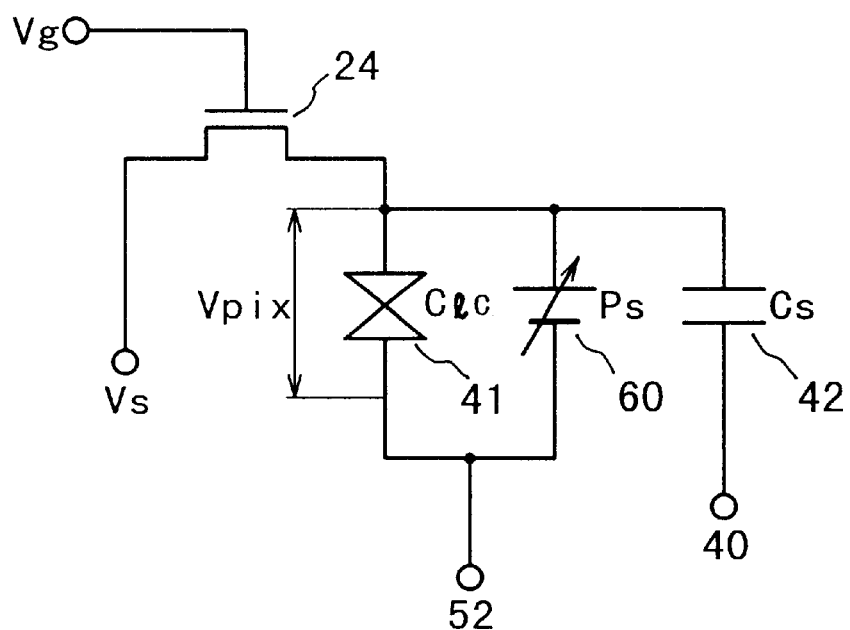
FIG. 4 is a diagram showing an equivalent circuit of the pixel shown in FIG. 3.

The panel pixel portion shown in FIG. 3 can be represented by an equivalent circuit shown in FIG. 4, wherein a spontaneous polarization Ps of the liquid crystal is represented by an element 60, and identical numerals as in FIG. 3 represent corresponding members in FIG. 4.

Figure 5:
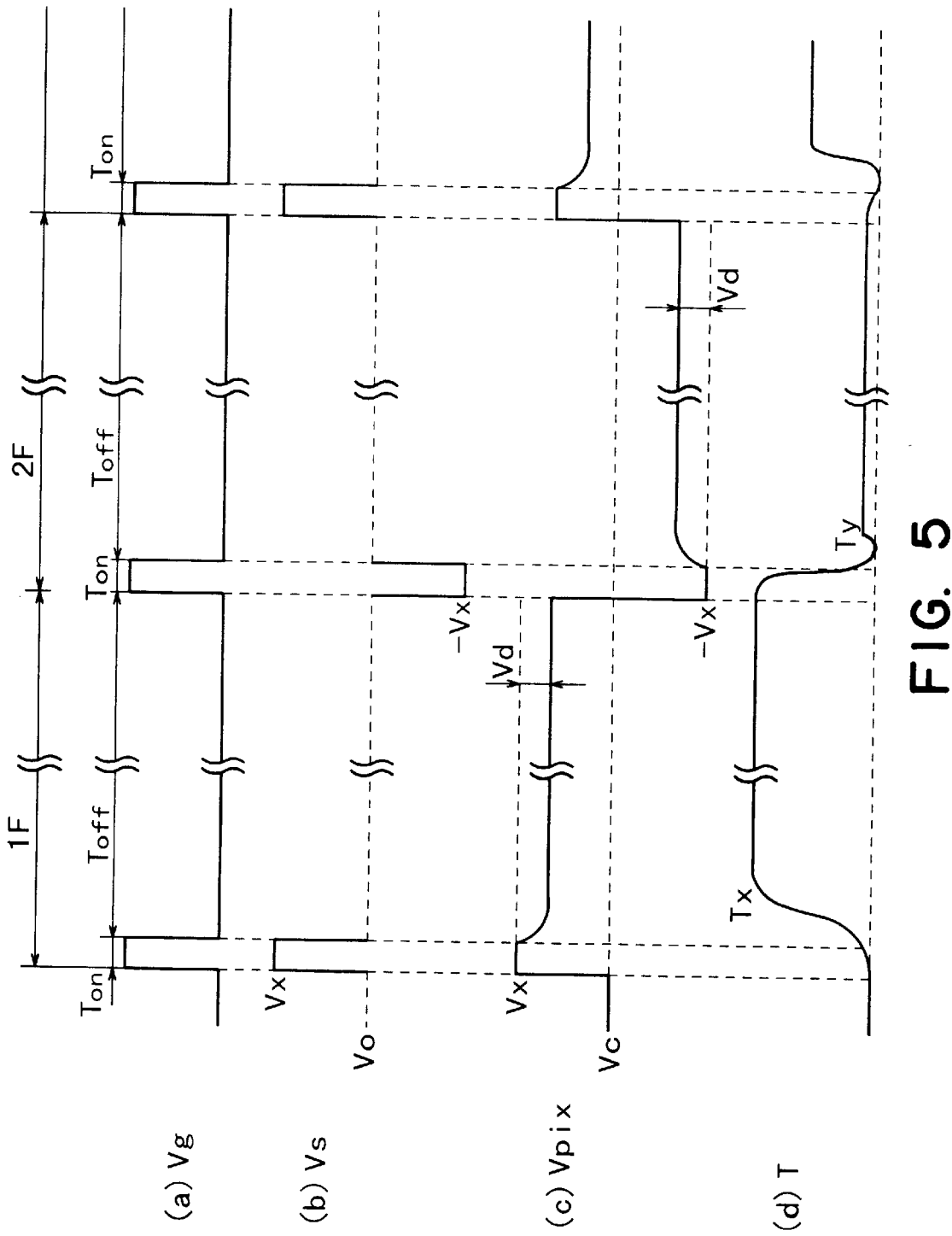
FIG. 5 shows an example set of drive signal waveforms for active matrix drive of a liquid crystal device according to the invention.

Referring to FIGS. 4 and 5, an active matrix drive of the liquid crystal device of the present invention will now be described. The liquid crystal device of the present invention may preferably be driven in such an active matrix drive mode that a period (one frame period) for displaying certain data at a pixel (and accordingly over a display panel) is divided into a plurality of unit periods (fields), e.g., two fields 1F and 2F shown in FIG. 5, and the polarity of voltage for data display at the pixel is inverted for each field to attain an emission light quantity on an average corresponding to prescribed data to be displayed at the pixel in the fields. In the liquid crystal device of the present invention, the tilt angle under the application of a first polarity voltage is different from the tilt angle under the application of a second polarity voltage, and accordingly, in the polarity inversion drive for each field as described above, the light emission quantities become different for the respective fields even under application of an identical absolute value of voltage. In the case where the transmittance or reflectance T1 under the application of a first polarity voltage and the transmittance or reflectance T2 under the application of a second polarity voltage are substantially different, preferably so as to satisfy $T1 \geqq 5 \times T2$, for a certain liquid crystal device, it is possible to effect a substantially non-hold display capable of improving the motion picture quality by regarding the field displaying T2 as a substantially non-display field (black display period). FIG. 5 shows a set of drive signal waveforms for realizing such a substantially non-hold display. Hereinbelow, the non-hold display mode will be described with reference to FIG. 5 for a transmission type liquid crystal device, for example, taken for convenience of description.

Noting a certain one pixel, at FIG. 5(a) is shown a voltage applied to a gate line (scanning signal line) connected to the pixel. In the liquid crystal device described with reference to FIGS. 2 to 4, the gate lines G1, G2, . . . are selected, e.g., line-sequentially in each field, and one gate line is supplied with a prescribed gate voltage Vg at a selection period Ton which is applied to the gate electrode 32 to turn on the TFT 24 for the noted pixel. On the other hand, during a non-election period Toff when the other gate lines are selected, the turn-on voltage Vg is not applied to the gate electrode 32 of the TFT 24 for the noted pixel, so that the TFT 24 is placed in a high-resistance state (off-state). At each Ton period for a noted pixel in each field, the gate line for the noted pixel is selected to turn on the TFT 24 for the noted pixel. The other gate lines are also selected once in each field for operation of the pixels thereon.

Now, in a first field (1F) in one frame period, a positive polarity source voltage at a level Vx corresponding to data written at the noted pixel, e.g., an optical state (transmitted light quantity) to be attained at the pixel, determined based on a voltage-transmittance (V-T) characteristic of the liquid crystal used, is supplied through a source line connected to the source electrode 37 of the TFT 24 for the noted pixel. As the TFT 24 is in the on state, the voltage Vx applied to the source electrode 37 is applied via the drain electrode 38 to the pixel electrode 25, thereby changing the liquid crystal capacitance ($C_{1c}$) 41 and the holding capacitance (Cs) 42 to raise the potential of the pixel electrode to Vx (data signal voltage). Then, during the non-selection period Toff for the gate line for the noted pixel, the TFT 24 is placed in a high resistance (off) state, and the charge stored at the selection period Ton is retained at the liquid crystal capacitance ($C_{1c}$) 41 and the holding capacitance (Cs) 42. As a result, the liquid crystal layer 59 at the noted pixel is supplied with the voltage Vx throughout the first field (1F) to provide an optical state (transmittance) at the noted pixel. In this instance, however, in the case of causing inversion of spontaneous polarization of the liquid crystal, a portion of the stored charge is canceled, whereby Vx cannot be retained as it is. The voltage drop Vd caused by the inversion of spontaneous polarization can be expressed by the following equation (1) as already mentioned above:

$$Vd = 2 \times Ps' \times S/(C_{1c} + Cs) \qquad (1).$$

Then, at a selection period Ton for the gate line associated with the noted pixel in a second field (2F), a source voltage (−Vx) of an identical absolute value and an opposite polarity compared with the source voltage (Vx) applied in the first field (1F) is applied to the same source electrode 37 of the TFT 24 for the noted pixel. As the TFT 24 is in the on state at this time, the voltage (−Vx) is applied to the pixel electrode 25 and retained at the liquid crystal capacitance ($C_{1c}$) 41 and the holding capacitance (Cs) 42 to place the pixel electrode at a potential (−Vx). Then, during the non-selection period Toff, the TFT 24 associated with the noted pixel is placed in a high resistance (off) state, so that the charge stored at the selection period Ton is retained at the liquid crystal capacitance ($C_{1c}$) 41 and the holding capacitance (Cs) 42, thus retaining the voltage (−Vx). As a result, the liquid crystal layer 59 at the noted pixel is supplied with the voltage (−Vx) throughout the second field (2F) to provide an optical state (transmittance) corresponding to the voltage (−Vx) at the noted pixel. Also in this instance, however, in the case of causing inversion of spontaneous polarization, a portion of the stored charge is canceled thereby, so that the voltage (−Vx) cannot be retained as it is. The voltage drop Vd at this time is also expressed by the above-mentioned equation (1).

At FIG. 5(c) is shown a time-serial change of voltage Vpix retained at the liquid crystal capacitance 41 and the holding capacitance 42 and applied to the liquid crystal layer, respectively at the noted pixel, and at FIG. 5(d) is shown a time-serial change of optical response (transmitted light quantity) at the noted pixel. As shown at FIG. 5(c), the voltages applied in the two fields 1F and 2F are at an identical level (absolute value) of Vx−Vd of opposite polarities. On the other hand, as shown at FIG. 5(d), the noted pixel shows a gradational display state (transmittance) Tx corresponding to Vx−Vd in the first field (1F) and a gradational display state (transmittance) Ty corresponding to −(Vx−Vd) in the subsequent second field (2F). The transmittance Ty in the second field is however only slight, substantially lower than Tx and close to zero level.

As described above, the liquid crystal layer is supplied with a voltage (Vx−Vd) which is a voltage Vx supplied from the source electrode minus Vd, and the voltage Vd exhibits the cell thickness dependence-2 governed by the equation (1). The degree of the cell thickness dependence can be controlled by appropriately adjusting Cs.

According to the above-mentioned active matrix drive scheme, the liquid crystal device of the present invention can be driven at a high speed for gradational display. A certain level of gradation is displayed at a pixel in two successive fields including a first field for displaying a high transmittance and a second field for displaying a low transmittance, whereby the resultant time-integrated aperture ratio becomes 50% or below, thus providing a motion picture high speed responsiveness detectable to human eyes. Further, in the second field, the transmittance is not completely reduced to zero due to some switching operation of the liquid crystal molecules, so that the luminance level detectable to human eyes is ensured over the entire frame period.

Further, in the first and second fields, voltages of an identical absolute value and opposite polarities are applied to the liquid crystal layer 59, so that the voltages actually applied to the liquid crystal layer 59 are alternated to prevent the degradation of the liquid crystal.

In the above-described matrix, an average of Tx and Ty is attained as an effective transmittance over one frame including two+fields. Accordingly, it is also preferred that the data signal voltage Vs is set to be a value which is larger than a voltage giving a desired gradation level corresponding to a prescribed picture data to be displayed over a frame, thus displaying a higher transmittance than the desired gradation level in the first field (1F).

Hereinbelow, the present invention will be described more specifically based on examples.

EXAMPLE 1

Cell Preparation

A pair of 1.1 mm-thick glass substrates, each having thereon a 70 nm-thick transparent electrode of ITO film, were provided. The transparent electrode of each substrate was coated by spin coating with a solution of precursor giving a polyimide having a recurring unit of the following formula, followed by pre-baking at 80° C. for 5 minutes and baking at 200° C. for 1 hour to form a 50 nm-thick polyimide coating film.

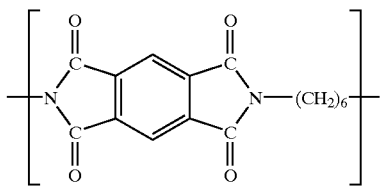

Then, the polyimide film was subjected to a uniaxial aligning treatment comprising rubbing with a 10 cm-diameter rubbing roller surfaced with a nylon cloth ("NF-77", made by Teijin K. K.) under the conditions of a pressing depth of 0.3 mm, a feed speed of 5 cm/second, a revolution speed of 1000 rpm and 8 times of feeding.

Then, on one of the above-treated pair of substrates, spacer silica beads were dispersed, and the other substrate was superposed thereon so that the rubbing directions on the two substrates were mutually parallel to form a blank cell, having an effective display area of 1 cm$^2$ (an effective area where the electrodes were opposed to each other for voltage application therebetween). The rubbing conditions provided a 9 $\mu$m-thick cell exhibiting a pretilt angle of 2.0 degrees as measured by the crystal rotation method (by using a composition LC-1 described below).

The above operation was repeated four times using four types of spacer silica beads having four different average particle diameters of 1.0 $\mu$m, 1.2 $\mu$m, 1.4 $\mu$m and 1.6 $\mu$m, whereby four types of blank cells (A to D, respectively) were prepared.

Liquid Crystal Composition

A liquid crystal composition LC-1 was prepared by mixing the following liquid crystal compounds at respectively indicated weight ratios.

| Compound | wt. parts |
|---|---|
| $C_6H_{13}$—pyrimidine—phenyl—$OC_{10}H_{21}$ | 17 |
| $C_{10}H_{21}$—pyrimidine—phenyl—$OC_8H_{17}$ | 17 |
| $C_8H_{17}$—pyrimidine—phenyl—$OCC_7H_{15}$ (=O) | 11.3 |
| $C_8H_{17}$—pyrimidine—phenyl—$OCC_6H_{13}$ (=O) | 11.3 |
| $C_9C_{19}$—pyrimidine—phenyl—$OCC_7H_{15}$ (=O) | 11.3 |
| $C_{11}H_{23}$—pyrimidine—phenyl—$OC$(=O)—thiophene—$C_4H_9$ | 30 |
| $C_{10}H_{21}$—pyrimidine—phenyl—$OCH_2CHC_8H_{17}$ (F*) | 2 |

The composition LC-1 exhibited the following physical properties.

Phase transition temperatures (°C.)

$$\text{Iso.} \xrightarrow{67.0} \text{Ch} \xrightarrow{50.6} \text{SmC*} \xrightarrow{-9.3} \text{Cry.}$$

Spontaneous polarization (30° C.): Ps=1.2 nC/cm$^2$ ($\frac{1}{2}$) Cone angle (30° C.): ⓗ=23.7 deg. Refractive index anisotropy (30° C.): $\Delta$n=0.18 Helical pitch in SmC* (30° C.): 20 $\mu$m or larger The above-mentioned spontaneous polarization value and ($\frac{1}{2}$) cone angle ⓗvalue were measured according to the following methods.

Spontaneous polarization was measured according to "Direct Method with Triangular Waves for Measuring Spontaneous Polarization in Ferroelectric Liquid Crystal", as described by K. Miyasato et al. (Japan. J. Appl. Phys., vol. 22, no. 10, L661 (1983)).

A sample liquid crystal device (cell thickness=1.4 $\mu$m) under application of AC voltages of ±30 to ±50 volts and frequencies of 1–100 Hz is rotated relative to a pair of right-angle cross nicol polarizers disposed in a fixed position sandwiching the sample device while being observed through a photomultiplier (aval lable from Hamamatsu Photonics K. K.) to determine a first extinction position (a first position giving a lowest transmittance) and a second extinction position (a second position giving a lowest transmittance). Half of the solution angle between the first and second extinction positions is taken as ($\frac{1}{2}$) cone angle ⓗ.

Device Preparation

Each of the above prepared blank cells was filled with the above-mentioned liquid crystal composition LC-1 at its isotropic phase temperature and, after sealing, gradually cooled to room temperature where LC-1 assumed SmC* phase. During the cooling, at a temperature around the Ch—SmC* phase transition, the liquid crystal was supplied with a DC offset voltage of −5 volts. As a result, four types of sample liquid crystal devices, called Devices A to D, were prepared. Incidentally, it was confirmed that similar liquid crystal devices were prepared also when the liquid crystal filling was performed at its cholesteric phase temperature.

Sample Devices A–D were respectively evaluated with respect to the following items.

(a) Alignment State

Each sample device was observed with respect to the liquid crystal alignment state through a polarizing microscope. As a result, in each device, the darkest axis under no voltage application was found to be at a position deviated 1.5 degree from the rubbing direction, and a uniform alignment state was observed such that only one smectic layer normal direction was observed over the entire device.

(b) Triangular Wave Response

Each sample device was set with a cross nicol polarizing microscope equipped with a photomultiplier so that the polarization axes were disposed to provide a darkest state for the device under no voltage application.

Then, each sample device was supplied with triangular waves of ±5 volts and 0.2 Hz to examine the optical response. As a result, each sample device exhibited a transmittance which gradually increased as the applied voltage increased in response to the application of positive polarity voltages. On the other hand, in response to the application of negative polarity voltages, each device exhibited an increased transmittance relative to that under no voltage application, but the maximum transmittance was about 1/10 of the maximum transmittance obtained under the application of the positive polarity voltages.

(c) Rectangular Wave Response

Each sample device was set with a cross nicol polarizing microscope equipped with a photomultiplier as in the above examination of triangular wave response, but was supplied with rectangular voltages of 60 Hz and ±5 volts, to examine the optical response. As a result, a sufficient optical response was attained in response to the application of positive polarity voltage to provide a stable halftone state not depending on the previous state. The device also exhibited an optical response to the application of negative polarity voltage at a level which was about 1/10 of that obtained under the application of the positive polarity of an identical absolute value.

However, when the four sample devices, i.e., Device A to D were each examined with respect to their voltage-transmittance (V-T) characteristics, Devices A to D exhibited remarkably different saturation voltages Vsat, i.e., minimum voltages giving a saturation transmittance, and relative transmittances at ±5 volts (percentage to saturation transmittances obtained under the application of saturation voltages), as shown in Table 1 below.

TABLE 1

Saturation voltage Vsat

| Device | Cell thickness (μm) | Relative transmittance relative | Vsat (volts) |
|---|---|---|---|
| A | 1.0 | 70% | 7.0 |
| B | 1.2 | 80% | 6.5 |
| C | 1.4 | 90% | 6.0 |
| D | 1.6 | 95% | 5.5 |
| Vsat(A)/Vsat(D) | — | — | 1.27 (=7.0/5.5) |

As shown in Table 1 above, a smaller cell thickness resulted in a larger saturation voltage and a smaller relative transmittance (representing a smaller tilt angle) under the application of ±5 volts. This is presumably because in the above prepared type of device, wherein the average molecular axis direction in the device under no electric field substantially agrees with the uniaxial aligning treatment direction, the liquid crystal molecules under drive were strongly affected by the uniaxial alignment regulation force as a result of the uniaxial aligning treatment.

(d) Measurement for an Active Element-Driven Device

Each of the above prepared sample Devices A to D was connected with an external transistor (one included in an IC of "TC4066BP", made by Toshiba K. K.) according to an equivalent circuit shown in FIG. 4 to form a quasi-TFT-driven liquid crystal device circuit, which was driven by applying drive waveforms as shown in FIG. 5. As a result of observation through a photomultiplier, a non-hold display at a field transmittance ratio of ca. 10/1 was confirmed.

Further, each sample device was subjected to a capacitance measurement. The results are shown in Table 2 below.

TABLE 2

Liquid crystal capacitance $C_{lc}$

| Device | $C_{lc}^{(nF)}$ |
|---|---|
| A | 3.00 |
| B | 2.50 |
| C | 2.14 |
| D | 1.88 |

Five types of devices were prepared by externally connecting holding capacitances Cs of 10 nF, 5 nF, 2 nF, 1 nF and 0 nF (none) alternatively in parallel with each sample device according to the equivalent circuit shown in FIG. 4 and were driven at different source voltages Vs to evaluate voltage-transmittance relationships and determine saturation voltages Vsat (minimum voltages for giving a saturation transmittance) for the respective devices. The results are inclusively shown in the following Table 3.

TABLE 3

Saturation voltages Vsat at different holding capacitance Cs

| Device | Cs = 10 [nF] | Cs = 5 [nF] | Cs = 2 [nF] | Cs = 1 [nF] | Cs = 0 |
|---|---|---|---|---|---|
| A | 7.3 V | 7.3 V | 7.5 V | 7.6 V | 7.8 V |
| B | 6.7 V | 6.8 V | 7.1 V | 7.2 V | 7.5 V |
| C | 6.2 V | 6.3 V | 6.6 V | 6.8 V | 7.1 V |
| D | 5.6 V | 5.7 V | 6.0 V | 6.3 V | 6.8 V |
| Vsat(A)/Vsat(D) | 1.30 | 1.28 | 1.25 | 1.21 | 1.15 |

As shown in Table 3 above, the devices having a holding capacitance of 5 nF or larger exhibited a large cell thickness dependence of the saturation voltage Vsat similar to the rectangular wave response shown in Table 2, whereas the devices having a smaller holding capacitance exhibited a smaller cell thickness dependence of Vsat.

As described above, according to the present invention, it has become possible to provide a liquid crystal device with a voltage-transmittance (V-T) characteristic change which is minimally dependent on a cell thickness change. Accordingly, it is possible to provide a liquid crystal device having a higher reliability at a higher production yield.

What is claimed is:

1. A liquid crystal device suitable for analog gradational display according to active matrix drive comprising:

a pair of substrates disposed to have mutually opposing surfaces of which at least one has been subjected to a uniaxial aligning treatment, and a chiral smectic liquid crystal disposed between the substrates so as to form a matrix of pixels, each provided with an active element and electrodes for applying a voltage to the liquid crystal via the active element, an average molecular axis of the liquid crystal being monostabilized at a first position under no voltage application, tilted under application of a first polarity of voltage in a first direction from the monostabilized first position depending on a magnitude of the applied voltage, and tilted under application of a second polarity of voltage opposite to the first polarity in a second direction opposite to the first direction from the monostabilized first position depending on a magnitude of the second polarity voltage, wherein the liquid crystal is placed in such an alignment state that a saturation voltage becomes larger at a smaller cell thickness so as to cancel a voltage drop caused by inversion of spontaneous polarization of the liquid crystal.

2. The liquid crystal device according to claim 1, wherein the active element is coupled with a holding capacitance Cs satisfying Cs≦1.5×$C_{1c}$, wherein the $C_{1c}$ represents a liquid crystal capacitance at the pixel.

3. The liquid crystal device according to claim 1, wherein the active element is coupled with a holding capacitance Cs of at most 3.0 nF/cm$^2$.

4. The liquid crystal device according to claim 1, wherein the active element is free from coupling with a holding capacitance.

5. The liquid crystal device according to claim 1, wherein the average molecular axis of the liquid crystal at the monostabilized first position forms an angle of below 5 degrees from a direction of the uniaxial aligning treatment applied to at least one of the opposing surfaces of the substrates.

* * * * *

UNITED STATES PATENT AND TRADEMARK OFFICE
CERTIFICATE OF CORRECTION

PATENT NO.    : 6,636,193 B1
DATED         : October 21, 2003
INVENTOR(S)   : Asao et al.

It is certified that error appears in the above-identified patent and that said Letters Patent is hereby corrected as shown below:

Title page.
Item [75], Inventors, "Yasufumi Asao, Kanagawa-ken (JP);
              Takeshi Togano, Kanagawa-ken (JP)" should read
              -- Yasufumi Asao, Atsugi (JP);
              Takeshi Togano, Chigasaki (JP) --.

Column 2,
Line 53, "angle a1" should read -- angle $\alpha 1$ --.
Line 58, "angle a2" should read -- angle $\alpha 2$ --.

Column 3,
Line 37, "monbstabilized" should read -- monostabilized --.

Column 6,
Line 52, "angle $\alpha 1$" should read -- angle $\beta 1$ --.

Column 8,
Line 23, "R1 and R2" should read -- $R_1$ and $R_2$ --.
Line 25, "X1 and X2" should read -- $X_1$ and $X_2$ --.

Column 14,
Line 40, "(aval lable" should read -- (available --.

Column 15,
Line 46, "relative" should be deleted.

UNITED STATES PATENT AND TRADEMARK OFFICE
CERTIFICATE OF CORRECTION

PATENT NO. : 6,636,193 B1
DATED : October 21, 2003
INVENTOR(S) : Asao et al.

It is certified that error appears in the above-identified patent and that said Letters Patent is hereby corrected as shown below:

Column 16,
Line 20, "alternatively" should read -- alternately --.
Line 30, "capacitance Cs" should read -- capacitances Cs --.

Signed and Sealed this

Twenty-seventh Day of April, 2004

JON W. DUDAS
*Acting Director of the United States Patent and Trademark Office*